June 7, 1960     I. H. SELDEN     2,939,560
HYDRAULIC POWER TRANSMISSIONS Filed March 22, 1955     6 Sheets-Sheet 1

FIG. 1

INVENTOR.
Irving H. Selden

FIG. 2A

INVENTOR.
Irving H. Selden

June 7, 1960 I. H. SELDEN 2,939,560
HYDRAULIC POWER TRANSMISSIONS
Filed March 22, 1955 6 Sheets-Sheet 3

FIG. 2D
FIG. 2B
FIG. 2C

INVENTOR.
Irving H. Selden

June 7, 1960     I. H. SELDEN     2,939,560
HYDRAULIC POWER TRANSMISSIONS Filed March 22, 1955     6 Sheets-Sheet 4

INVENTOR.
Irving H. Selden

June 7, 1960     I. H. SELDEN     2,939,560
HYDRAULIC POWER TRANSMISSIONS
Filed March 22, 1955     6 Sheets-Sheet 5

INVENTOR.
Irving H. Selden

INVENTOR.
Irving H. Selden ns
2,939,560
HYDRAULIC POWER TRANSMISSIONS
Irving H. Selden, 1801 S. 112th, Tacoma, Wash.

Filed Mar. 22, 1955, Ser. No. 495,921

7 Claims. (Cl. 192—58)

This invention relates to hydraulic transmission gears of the type comprising a rotor housed in a casing and provided with vanes which cooperate with abutments in the casing or consisting of a driving flange, a driven shaft and a gear casing fixed on the flange and a rotor rigid with the shaft and enclosed in the gear casing.

One object of this invention is to provide means of controlling the ratio of such converters.

Another object of the invention is to provide a pivoting vane, designed to cause a minimum amount of turbulence in the working channel during ratio changes, and to provide said vane with a balancing area to offset the pressures exerted against said vane on the channel side, said vane being so designed as to require a minimum overall diameter in the said transmission.

Although both the outer casing or enclosing frame and the inner rotor will rotate, in the following description rotor will refer only to the inner rotor. The vanes will be the pivoting valve members and the abutments the rotating members with passing slots.

Other objects and advantages of the invention will appear in the following detailed description taken in connection with the accompanying drawings forming a part of this specification and in which drawings.

Similar parts throughout the several figures will bear the same designation numbers.

Figure 1:
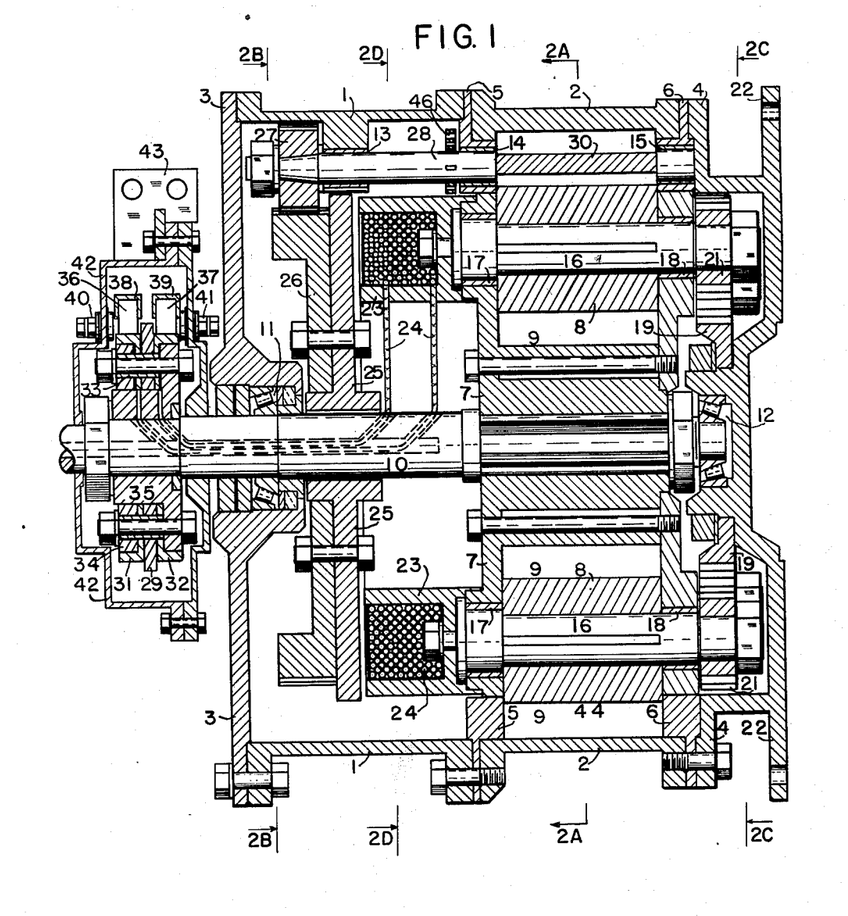
Fig. 1 is a vertical cross-sectional view taken longitudinally with the shaft on the line 1—1 of Fig. 2A.
Figure 2A:
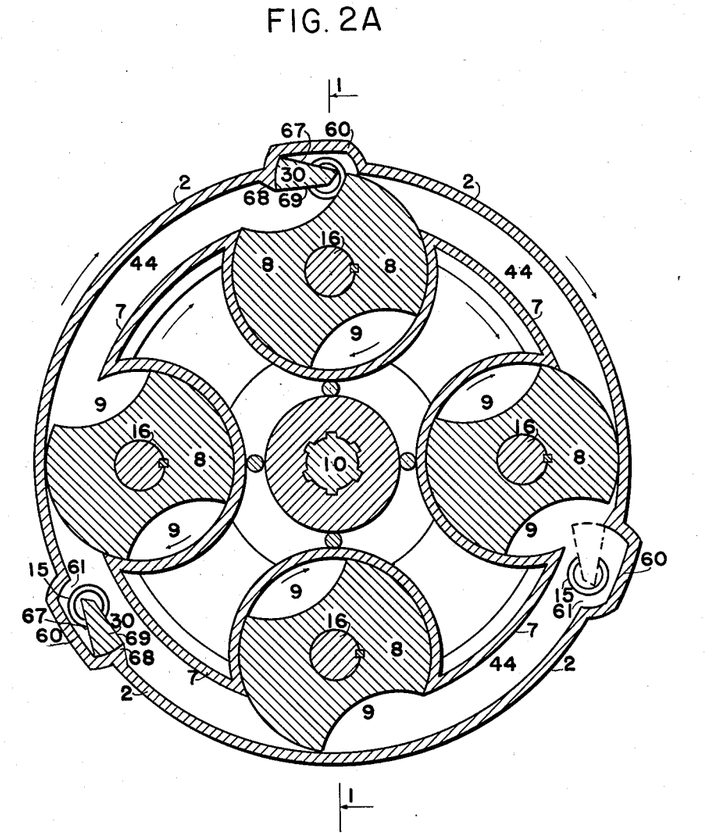
Fig. 2A discloses a vertical section taken on line 2A—2A of Fig. 1 showing a cross section of the vanes and abutments and the annular channel.

Referring now to the drawings, Figs. 1 and 2A, it will be seen that the gear casing comprises two cylindrical enveloping bodies 1 and 2 and end plates 3 and 4. Annular channel end rings 5 and 6 with enveloping casting 2 form three sides of an annular channel 44 adapted to hold fluid of which the rotor 7 forms the inner convex surface. Four rotary abutments 8 are each arranged with two radial vane passing slots 9 extending the full length of the abutments, the inner surface of said passing slots being arc shaped. One passing slot would be sufficient to allow the vanes to pass but the abutments are disegned with two passing slots for balancing purposes only.

Said abutments are carried by the rotor 7 which is splined to and turns on shaft 10 in bearings 11 and 12. The channel end rings 5 and 6 hold the bearings 14 and 15, in which the pivoting vanes 30 are carried.

Said pivoting vanes which extend the full length of the channel and arranged to open or close said channel are similar to half of a butterfly valve and are designed to vary the amount of fluid that flows past them in the channel to thus control the ratio of the transmission or the amount of slippage between the gear casing and the rotor. Thus they act as valves to control the amount of slippage required. When closed entirely they prevent any slippage between the gear casing and the rotor. The rotary abutments 8 on shafts 16 turn in bearings 17 and 18 in the same direction as the rotor and gear casing and are driven by main gear 19 fastened to end plate 4 which turns intermediary or reversing gears 20 to drive the gears 21 keyed to the shafts 16. The rotary abutments 8 arranged with passing slots are turned at a ratio of 3 to 1 of the main rotor and timed to allow the vanes to pass through said passing slots and travel in the annular channel dividing it into four working chambers which are filled with a suitable hydraulic fluid.

End plate 4 is constructed to also form a driving flange 22 designed to be bolted to a flywheel (not shown) of a suitable power source.

A chamber utilized to enclose elements for controlling the angle of the pivoting vanes is formed in the cylindrical frame body 1 between the end of the rotor and end plate 3. Annular or ring shaped metal channel 23 opened on one end and wound with suitable wire 24 properly insulated and coiled to form an electric magnet, externally energized is coaxial with and bolted to the rotor 7.

An armature is formed by a disc shaped iron or iron alloy plate 25 bolted to the large pitch control gear 26 which meshes with gears 27 keyed to the shafts 28 of the pivoting vanes 30. Two annular commutator rings 31 and 32 separated by a suitable plastic or fibre ring 29 additionally insulated by tubes 33 and ring 34 and bolted to the plastic or fibre hub 35 are connected through the hollow shaft 10 by wires 24 to the magnet 23. Brushes 36 and 37 held in pivoting arms 38 and 39 are electrically connected to bolts 40 and 41 and pivot thereon. Said bolts 40 and 41 are insulated and pass through housing 42 to furnish means for connecting the electric control leads.

External housing 42 is furnished with anchoring bracket 43.

Description of operation

Figures 2B, 2C, 2D:
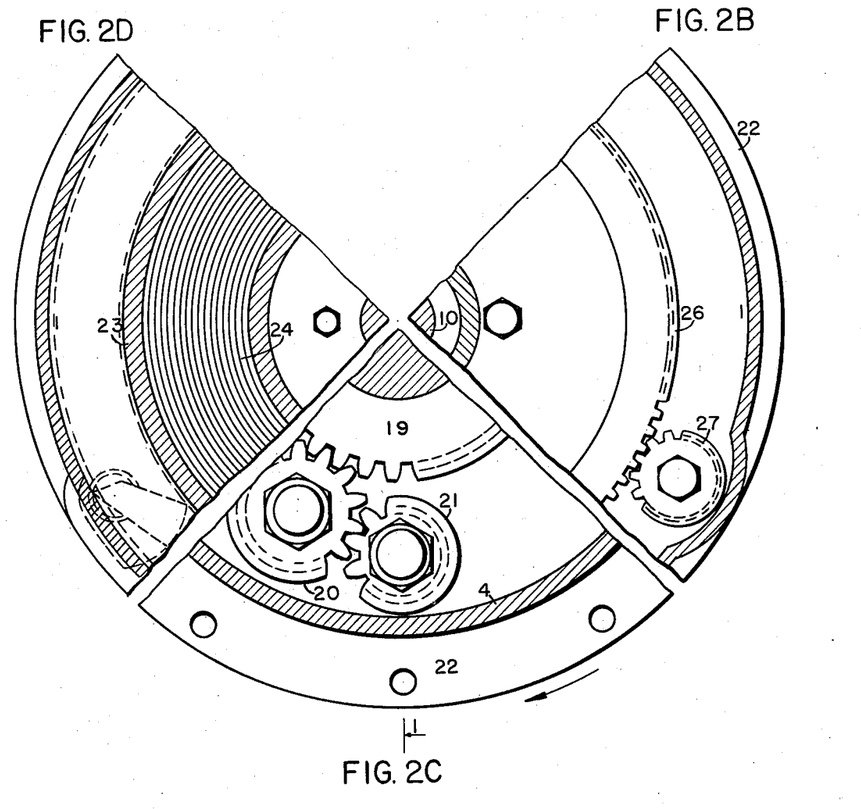
Fig. 2B is a quarter vertical section of Fig. 1 taken on line 2B—2B disclosing the gears 26 and 27 that control the angle of the vanes.
Fig. 2C is a quarter vertical section of Fig. 1 taken on line 2C—2C of Fig. 1 and shows the main abutment drive gear 19 and the gears 20 and 21 that combine to turn the abutments.
Fig. 2D is a quarter vertical section of Fig. 1 taken on line 2D—2D of Fig. 1 and discloses the position and make up of the magnet. The annular channel is shown in broken lines and reveals the position of a vane when closed also in broken lines.

The hydraulic transmission gear shown in Figs. 1, 2A, 2B, 2C and 2D operates as follows:

With a source of power (not shown) connected to the driving flange 22, Figs. 1 and 2C, and turning the enclosing frame in the direction of the arrow at a slow or idling speed, the pivoting vanes 30 held in position by coil springs 46 retain the normal or neutral position as shown at the top of Fig. 2A. Said coil springs being applied in the usual manner are fitted into a key-way in the vane shaft on their inner end and bolted to the gear casing on their outer end.

Assuming that the rotor shaft 10 is connected to means for performing sufficient work the rotor 7 splined to shaft 10 will remain in a stationary position. The rotating abutments 8, with the passing slots 9, geared and driven by the main gear 19 which rotates with the frame and turns the abutments at a ratio of 3 to 1 of the rotor allows the vanes to pass as shown at top of Fig. 2A.

With the working space of the annular channel and vane passing slots filled with a hydraulic fluid it can be seen that the said fluid would remain practically stationary in relation to the rotor, this due to the fact that since the abutments are 180 degrees out of phase with each other no more than two of the four rolling abutments ever have a passing slot exposed to the outer or concave surface of the channel at the same time. Also since the passing slots require considerably less than half the circumference of the abutments it will follow that the annular channel will always be closed by at least two abutments. Thus the fluid is effectively blocked in a stationary position in relation to the rotor.

With an increase of r.p.m.'s of the enclosing frame the angle of the vanes is gradually changed from the neutral position as disclosed at the top of Fig. 2A until they are finally in a closed position as shown at lower right, Fig. 2A. Through this gradual change of the angle of the vanes the ratio of the transmission also changed from neutral gradually to a 1 to 1 ratio.

Although there appears to be no stator or stationary member in this mechanism which would incline one to regard it as a fluid clutch only, there are other elements that should be appraised. The mechanism can better be understood if considered as the combination of a hydraulic pump and a hydraulic motor wherein the surface of the pistons in the motor can be varied while the displacement of the pump is constant. Considered in this light the mechanism would appear to also act as a reduction gear.

The change in the angle of the vanes is accomplished as follows. A circular magnet 23 is formed by an annular channel open on one end and wound with insulated wire with the proper gauge and number of turns to give a maximum magnetic field depending on whether designed to work on a 6 or 12 volt battery. When electrically energized, the magnet attracts a disc type of armature 25, which moves longitudinally along shaft 10 of the transmission.

The disc type armature 25 is bolted to master gear 26. Gear 26 meshes with 3 spur gears 27 one on each of the three pivoting vanes. The coil springs 46 tending to hold the vanes in neutral position also tend to hold the spur gears 27 stationary which in turn hold the master gear 26 stationary in relation to the housing. Consequently when the housing turns and the rotor is standing in neutral the gear and armature disc turn on shaft 10 and rotate adjacent to the magnet 23 which is standing stationary with the rotor.

When the magnet 23 is energized the disc 25 is pulled against its field. The resulting friction retards disc 25 and gear 26 producing a retrograde movement with respect to casing 1 which in turn, turns gears 27 and the vanes against the tension of their springs. As the current controlled by a rheostat (see Fig. 7) is increased, the vanes are gradually turned towards a closed position.

If the load on the driven shaft is greater than the power applied, the vanes will not turn to an entirely closed position but will allow a certain amount of slippage between the enclosing frame and the rotor, at which time the transmission would be operating at a reduced ratio. When they become closed (see vane lower right of Fig. 2A) and the transmission is operating in a 1 to 1 ratio there is no further movement between the rotor and the enclosing frame and the disc 25 is also stationary with the magnet. Accordingly the ratio of the transmission would vary all the way from neutral to a 1 to 1 ratio. If the current in the circuit were decreased at any time the coil springs would tend to restore the vanes toward a neutral position to reduce the working area of the vanes and slippage between the enclosing frame and the rotor would occur thereby increasing the ratio of the transmission.

Figure 7:
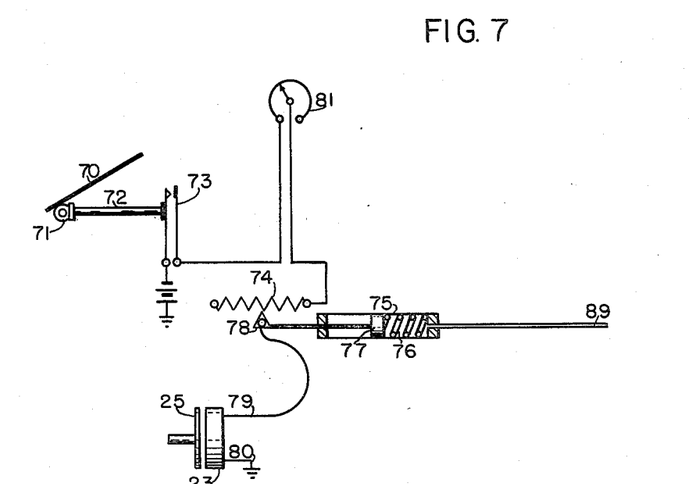
Figs. 7 and 8 are simplified schematic drawings disclosing two methods of application and control in adaptations of the transmissions for automobile use.

In Fig. 1 insulated conductors 24 pass through the center of the hollow shaft 10 to the externally mounted housing 42 in which the commutator rings 31 and 32 are mounted on the plastic or fibre hub 35 separated by insulating disc 29 and further insulated by plastic tubes 33 and 34 and effectively bolted together. Brushes 36 and 37 are held in arms 38 and 39 and pivoted on bolts 40 and 41 and electrically connected thereto with flexible woven copper strips (not shown) between the arms 38 and 39 and bolts 40 and 41 respectively in a normal manner and held against the commutators with coil springs (not shown). Bolts 40 and 41 insulated from enclosing frame 42 provide means for connecting leads 79 and 80 (Fig. 7). Bracket 43 is provided to fasten the enclosing frame in a rigid position to any suitable cross-member. The disclosure as shown has insulated wiring all the way from the magnet to the terminating bolts 40 and 41.

Figure 3:
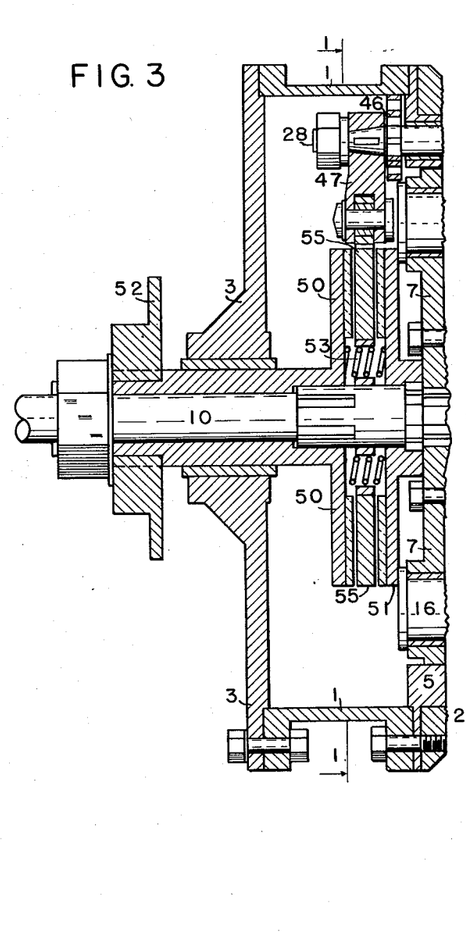
Fig. 3 is a partial view of Fig. 1 disclosing a modification of the clutching method in controlling the angle of the vanes.
Figure 4:
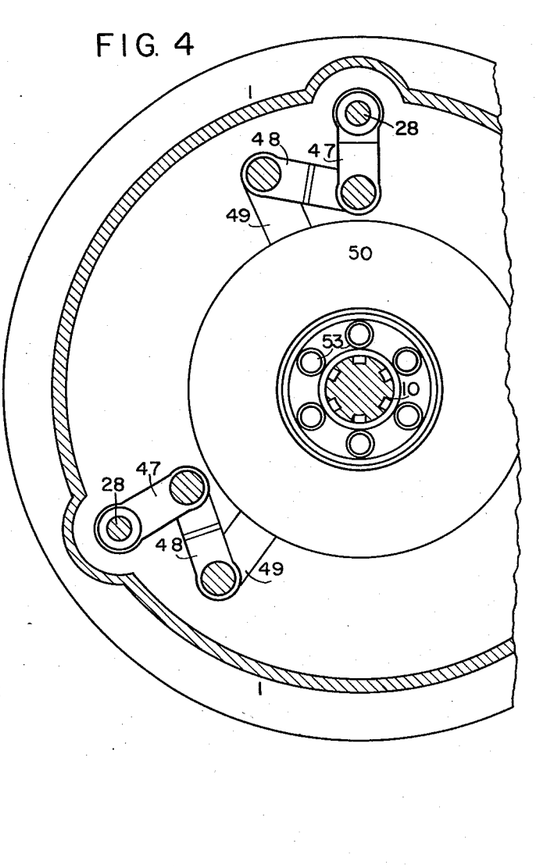
Fig. 4 is a view of the modification in vertical section taken on line 1—1 of Fig. 3.

Referring to Figs. 3 and 4 a different method of ratio control is disclosed. Designed for use on a similar type transmission to that disclosed in Fig. 1 a friction type clutch type brake is utilized to replace the magnet 23 and disc 25 of Fig. 1.

In neutral at idling speeds shaft 10 and rotor 7 are stationary. The vane shafts 28 are equipped with control levers which are connected by links 48 to arms 49 on movable clutch disc 55. The housing and clutch disc 55 with arms 49 attached rotate with arms and links 47 and 48. Anchored coil springs 46 attached to the vane shafts 28 tend to hold the vane in a neutral position as shown at the top of Fig. 2A. Clutch plate 51 and movable plate 50 both splined to the shaft 10 are stationary in neutral. Pressure either manual or mechanical horizontally against thrust ring 52 compresses springs 53 and clutch disc 55 is gripped between plates 50 and 51. The resulting friction tends to hold disc 55 from turning which tends to turn the levers 47 and their respective vanes against the tension of the coil springs 46. The greater the pressure exerted the greater the angle of the vanes until they are finally turned to a completely closed position and the ratio of the transmission is 1 to 1 when there would be no more sliding between disc 55 and the gripping discs 50 and 51.

Thus the ratio of the transmission would vary all the way from neutral to a 1 to 1 ratio. If the pressure exerted on thrust ring 52 were decreased at any time the coil springs would tend to restore the angle of the vanes and slippage between the enclosing frame and the rotor would increase thereby increasing the ratio of the transmission.

Figure 5:
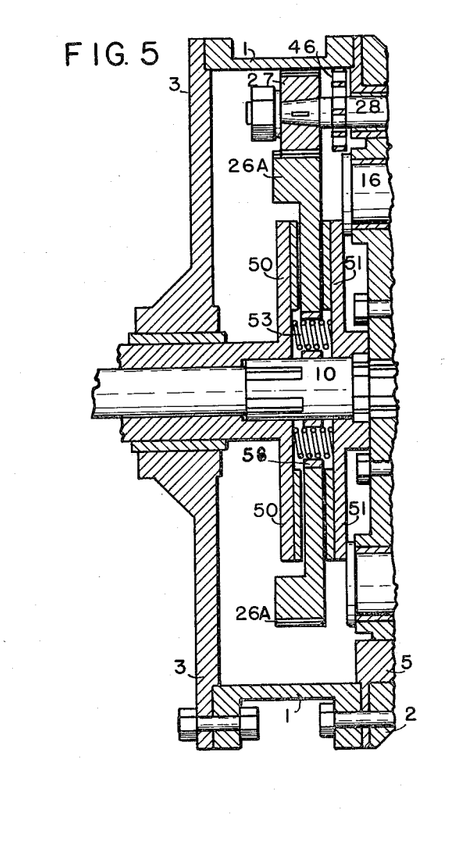
Fig. 5 is a partial vertical section similar to that disclosed in Fig. 3 but disclosing gears instead of levers for the mechanical linkage in controlling the angle of the vanes.

Fig. 5 discloses a disc gear 26A designed to be used in place of disc 55 of Fig. 3 when vane gears 27 (Fig. 1) would be utilized instead of levers and links 47 and 48. Fig. 4. This disclosure reveals a substitution whereby gears might be used instead of the levers as disclosed in Fig. 4. Fig. 5 also shows the hub 56 which is likewise utilized in disc 55 of Fig. 3. Hub 56 holds springs 53 and is stationary with shaft 10. Disc 55 and 26A both turn on a disc 56.

Figure 6:
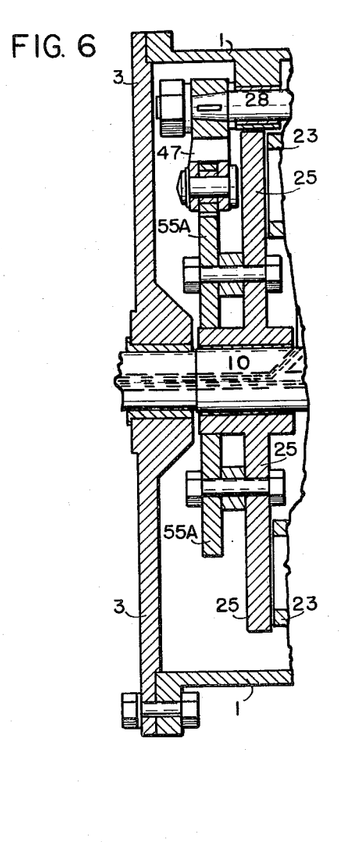
Fig. 6 is a partial section of a transmission as disclosed in Fig. 1 but in which levers and links are shown instead of gears.

Fig. 6 discloses a modification of Fig. 1 wherein a substitute disc 55A (Fig. 3) with lugs 49 is bolted to disc 25 instead of the gear 26 as disclosed in Fig. 1. In this arrangement levers 47 and links 48 would be utilized to control the angle of the vanes. The operation would be similar to that described for Fig. 1.

The ratio of the magnetic transmission as disclosed in Fig. 1 could be controlled manually with a rheostat, but Fig. 7 discloses a means of automatic operation when applied in connection with a gas engine as in an automobile utilizing the vacuum pressure. The vacuum pressure in pipe 89 is high when a motor is idling, therefore contact 73 is arranged to open the electric circuit when the throttle 70 is normal. When throttle 70 is depressed cam 71 turns and moves push rod 72 which operates contacts 73 and energizes rheostat 74. Depressing the throttle reduces the vacuum in cylinder 75 and spring 76 restores the piston to the left end of the rheostat 74 thus cutting in all the resistance at contact 78 and magnet 23 is energized with a minimum current. As the vacuum pressure increases piston 77 moves against the spring 76 and moves contact 78 and the current increases and increases the friction on disc 25 to reduce the ratio of the transmission and increase the load on the engine thereby effecting the vacuum pressure which in turn effects the current in the magnet. Thus it can be seen that considering the pull of the magnet and resulting friction a balance may be reached with the proper resistance of rheostat 74 the size of cylinder 75 the strength of spring 76 and the engine horsepower and vacuum pressure to provide a smooth ratio change from neutral to a 1 to 1 ratio. Variable rheostat 81 manually operated may be used to compensate for engine deficiency, or for heavy hauling and varying conditions such as driving on snow, loose gravel or mud, etc.

Figure 8:
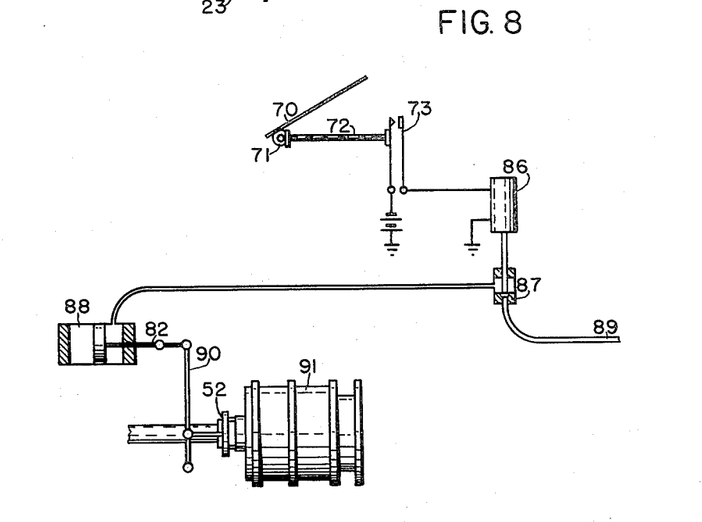

In Fig. 8 an automatic application of the type of converter as disclosed and described for Figs. 3, 4 and 5 is disclosed wherein the vacuum pressure is utilized to operate the clutch type brake to change the ratio of the transmission. Foot throttle 70 turns cam 71 to move push-rod 72 to operate electrical contact 73 to energize solenoid relay 86. Relay 86 opens valve 87 to energize vacuum cylinder 88.

Piston 82 moves lever 90 to exert pressure at thrust ring 52 to control the ratio of the transmission 91. Valve 87 could be operated directly by the push-rod 72 but might require too much pressure on the foot throttle. The object of the throttle control is to prevent energizing of cylinder 88 during idling intervals when the vacuum pressure would be high.

The purpose of the shape of the vanes as disclosed in Fig. 2A is to reduce turbulence and the resulting generation of heat. In some previous designs the vanes have been arranged to cut through the fluids thus producing 2 streams of fluid and a comparatively greater amount of turbulence. By designing the vanes to close the channel from one side it is possible to keep the fluid in one stream which would tend to reduce turbulence during ratio changes and thus tend to keep the generation of heat to a minimum.

The purpose of the V-shaped section of the vanes is to furnish a balancing surface 67 to equalize the pressure exerted on the vanes on the channel side during ratio changes. It has been estimated that at times during normal operation of the transmission, if applied for use in an automobile, the fluid pressure in the channel would be 100 lbs. per square inch or more. Referring to Fig. 2A, if the vane at lower right had no balancing surface it can be seen that it would take a great deal of power at times to turn it to a closed position as shown. By arranging for a by-pass channel 61 ahead of the vanes to also give the fluid access to the back side of the vanes and by furnishing a balancing surface 67 on the back side of said vanes so that the fluid may exert an equal pressure on both sides of the vanes, the pressure of the fluid in the channel and its resultant action on the vanes is thus neutralized by the said balancing surface. By furnishing an equal area on both sides of the vanes and arranging for equal exposure to them from the fluid in the channel, the varying pressure of the fluid in the channel can neither tend to turn the vanes nor retard their being turned by another source of power. The vane bearings 15 are positioned in such a manner that the vanes when in neutral position reduce the cross-section of the channel (see vane shield 68) a small amount negligible during idling speeds. The purpose of this is to position the vanes in such a manner as to restrict their travel to as few degrees of turn as possible thus holding the greatest distance between the working surface of the vanes and their balancing surface to a minimum. By keeping the greatest thickness of the vanes to a minimum the depth of the vane revetments 60 is kept to a minimum thereby keeping the overall diameter of the tranmission to a minimum. The vane shields 68 serve two purposes. One is to furnish a tapering surface from the edge of the vane when in neutral back to the outer arc of the annular channel to reduce turbulence and friction to the hydraulic fluid that must pass the vanes when the transmission is in neutral. The other purpose of the vane shield is to furnish a sealing surface for the edge of the balancing surface of the vanes to wipe against to prevent the hydraulic fluid from by-passing around the back side of said vanes when the vane is in an entirely closed position as shown at the lower right of Fig. 2A. This permits a thinner overall thickness of the vane while still enabling the vane to block the fluid in the channel when in a closed position. It should be noted that the angle formed between the extension of the surface line 69 and that of the balancing surface 67 is less than 90 degrees.

Having thus described the invention what I claim is:

1. An hydraulic power transmission comprising in combination, a rotatable driving member, a driven shaft, a cylindrical gear casing fixed on said driving member coaxial with said shaft, a cylindrical rotor of smaller radius than said casing rigid with said shaft and enclosed in said casing to provide an annular channel between said rotor and casing, end walls on said casing closing both ends of said channel and adapted to hold hydraulic fluid in said channel, cooperating power transmitting elements in said casing and on said rotor comprising respectively a plurality of pivoting vane members and rotary abutment members; said rotor having longitudinal cylindrical bores intersecting and opening through its peripheral surface, said abutment members being cylindrical and the same length as said rotor, said abutment members being mounted in said bores with a rotating fit and extending outward in rolling contact against the inner surface of said casing to divide said annular channel into a plurality of working spaces, each abutment member being equipped with two radial passing slots extending the full length of said abutment member to a depth equal to the width of said channel, said abutment members being geared to said casing to turn in the same direction as said rotor and casing and timed to allow passage of said vane members when said vane members project into said channel, said abutment members having their passing slots 180° out of phase with respect to each other and arranged to hold fluid in said channel stationary in relation to said rotor; said vane members extending the full length of said channel on the outer side thereof and being about twice as wide as said channel, vane shafts for said vane members pivotally mounted in said casing and equipped with coil springs which tend to restore the vane members to a normally open position, said coil springs having inner ends secured to said vane shafts and outer ends secured to said casing, said vane members being arranged to open and close said channel; an annular electrically controlled magnet mounted on said rotor coaxial therewith, means to energize said magnet, an armature adjacent said magnet comprising a metal disc coaxial with the transmission, a gear fixed on said disc coaxial with the transmission, gears on said vane shafts meshing with said disc gear; said disc and disc gear being loosely mounted on said driven shaft and arranged to rotate with said casing when the transmission is operating in neutral with said vane members in open position but arranged to be retarded by a braking action due to friction between said magnet and disc when said magnet is energized to attract said disc, said retarding action of said disc gear turning said vane shafts and vane members whereby said vane members act as valves in said annular channel to regulate the amount of fluid that passes them to govern the amount of relative rotation between said casing and rotor and thus control the ratio of the transmission, the amount of turning of the vane members being dependent on the amount of current that energizes said magnet.

2. The hydraulic power transmission of claim 1 including further, insulated lead wires from said magnet passing through said driven shaft, insulated annular commutator rings connected with said lead wires and mounted on said driven shaft externally of said transmission, a separate housing enclosing said commutator rings, a pair of bolts in said housing forming terminals for connecting control wires to energize said magnet, arms pivotally mounted on said bolts, and brushes on said arms contacting said commutator rings.

3. An hydraulic power transmission comprising in combination, a rotatable driving member, a driven shaft, a cylindrical gear casing fixed on said driving member coaxial with said shaft, a cylindrical rotor of smaller radius than said casing rigid with said shaft and enclosed in said casing to provide an annular channel between said rotor and casing, end walls on said casing closing both ends of said channel and adapted to hold hydraulic fluid in said channel, cooperating power transmitting elements in said casing and on said rotor comprising respectively a plurality of pivoting vane members and rotary abutment members; said rotor having longitudinal cylindrical bores intersecting and opening through its peripheral surface, said abutment members being cylindrical and the same length as said rotor, said abutment members being mounted in said bores with a rotating fit and extending outward in rolling contact against the inner surface of said casing to divide said annular channel into a plurality of working spaces, each abutment member being equipped with two radial passing slots extending the full length of said abutment member to a depth equal to the width of said channel, said abutment members being geared to said casing to turn in the same direction as said rotor and casing and timed to allow passage of said vane members when said vane members project into said channel, said abutment members having their passing slots 180° out of phase with respect to each other and arranged to hold fluid in said channel stationary in relation to said rotor; said vane members extending the full length of said channel on the outer side thereof and being about twice as wide as said channel, vane shafts for said vane members pivotally mounted in said casing and equipped with coil springs which tend to restore the vane members to a normally open position, said coil springs having inner ends secured to said vane shafts and outer ends secured to said casing, said vane members being arranged to open and close said channel, an annular electrically controlled magnet mounted on said rotor coaxial therewith, means to energize said magnet, an armature adjacent said magnet comprising a large metal disc coaxial with the transmission, a small disc attached to said large disc coaxial with the transmission, arms and connecting links on said small disc, levers on said vane shafts connected with said links, said discs and associated arms, links and levers being arranged to rotate with said casing when the transmission is operating in neutral with said vane members in open position but arranged to be retarded by a braking action due to friction between said magnet and large disc when said magnet is energized to attract said disc, said retarding action of said discs turning said vane shafts and vane members whereby said vane members act as valves in said annular channel to regulate the amount of fluid that passes them to govern the amount of relative rotation between said casing and rotor and thus control the ratio of the transmission, the amount of turning of the vane members being dependent on the amount of current that energizes said magnet.

4. A hydraulic power transmission comprising in combination, a rotatable driving member, a driven shaft, a cylindrical gear casing fixed on said driving member coaxial with said shaft, a cylindrical rotor of smaller radius than said casing rigid with said shaft and enclosed in said casing to provide an annular channel between said rotor and casing, end walls on said casing closing both ends of said channel and adapted to hold hydraulic fluid in said channel, cooperating power transmitting elements in said casing and on said rotor comprising respectively a plurality of pivoting vane members and rotary abutment members; said rotor having longitudinal cylindrical bores intersecting and opening through its peripheral surface, said abutment members being cylindrical and the same length as said rotor, said abutment members being mounted in said bores with a rotating fit and extending outward in rolling contact against the inner surface of said casing to divide said annular channel into a plurality of working spaces, each abutment member being equipped with two radial passing slots extending the full length of said abutment member to a depth equal to the width of said channel, said abutment members being geared to said casing in turn in the same direction as said rotor and casing and timed to allow passage of said vane members when said vane members project into said channel, said abutment members having their passing slots 180° out of phase with respect to each other and arranged to hold fluid in said channel stationary in relation to said rotor; said vane members extending the full length of said channel on the outer side thereof and being about twice as wide as said channel, vane shafts for said vane members pivotally mounted in said casing and equipped with coil springs which tend to restore the vane members to a normally open position, said coil springs having inner ends secured to said vane shafts and outer ends secured to said casing, said vane members being arranged to open and close said channel; a disc fixed to said driven shaft adjacent said rotor, a movable combined disc and sleeve splined to said driven shaft for axial movement thereon, a thrust ring on said sleeve arranged to receive and transmit axial thrust from an external source to said movable disc, a floating disc coaxial with and disposed between said two discs, springs forcing said two discs apart to clear said floating disc, arms extending from the periphery of said floating disc, links connected to said arms, control levers attached to the ends of said vane shafts and connected with said links; said floating disc, arms, connecting links and control levers all turning in unison with said casing when the transmission is operating in neutral with said vane members held in open position by said coil springs on the vane shafts but said floating disc, extending arms and connecting links being arranged to be retarded by a braking action exerted on said floating disc when axial thrust is applied to said thrust ring moving said movable disc into gripping relation with said floating disc, said retarding action pivoting said control levers to adjust the angle of the pivoting vane members in said annular channel and regulate the amount of fluid that passes said vane members thereby governing the rate of relative rotation between said casing and rotor to control the ratio of the transmission.

5. A hydraulic power transmission comprising in combination, a rotatable driving member, a driven shaft, a cylindrical gear casing fixed on said driving member coaxial with said shaft, a cylindrical rotor of smaller radius than said casing rigid with said shaft and enclosed in said casing to provide an annular channel between said rotor and casing, end walls on said casing closing both ends of said channel and adapted to hold hydraulic fluid in said channel, cooperating power transmitting elements in said casing and on said rotor comprising respectively a plurality of pivoting vane members and rotary abutment members; said rotor having longitudinal cylindrical bores intersecting and opening through its peripheral surface, said abutment members being cylindrical and the same length as said rotor, said abutment members being mounted in said bores with a rotating fit and extending outward in rolling contact against the inner surface of said casing to divide said annular channel into a plurality of working spaces, each abutment member being equipped with two radial passing slots extending the full length of said abutment member to a depth equal to the width of said channel, said abutment members being geared to said casing to turn in the same direction as said rotor and casing and timed to allow passage of said vane members when said vane members project into said channel, said abutment members having their passing slots 180° out of phase with respect to each other and arranged to hold fluid in said channel stationary in relation to said rotor; said vane members extending the full length of said channel on the outer side thereof and being about twice as wide as said channel, vane shafts for said vane members pivotally mounted in said casing and equipped with coil springs which tend to restore the vane members to a normally open position, said coil springs having inner ends secured to said vane shafts and outer ends secured to said casing, said vane members being arranged to open and close said channel; a disc fixed to said driven shaft adjacent said rotor, a movable combined disc and sleeve splined to said driven shaft for axial movement thereon, a thrust ring on said sleeve arranged to receive and transmit axial thrust from an external source to said movable disc, a floating disc coaxial with and disposed between said two discs, springs forcing said two discs apart to clear said floating disc, gear teeth on the periphery of said floating disc, gears on the ends of said vane shafts in mesh with said last gear; said floating disc, peripheral gear and related meshing gears all turning in unison with said casing when the transmission is operating in neutral with said vane members in open position but said floating disc and peripheral gear being arranged to be retarded in said turning motion when an axial thrust is exerted on said thrust ring moving said movable disc into gripping engagement with said floating disc causing said peripheral gear to turn relative to said casing, said relative turning rotating meshing gear on said vane shafts and said vane members to control the angle of the pivoting vane members in said annular channel regulating the amount of fluid that passes said vane members to govern the rate of relative rotation between said casing and rotor and thus control the ratio of the transmission, said springs on said vane shafts returning said vane members toward their neutral open positions as the axial thrust on said thrust ring is reduced.

6. An hydraulic power transmission comprising in combination, a rotatable driving member, a driven shaft, a cylindrical gear casing fixed on said driving member coaxial with said shaft, a cylindrical rotor of smaller radius than said casing rigid with said shaft and enclosed in said casing to provide an annular channel between said rotor and casing, end walls on said casing closing both ends of said channel and adapted to hold hydraulic fluid in said channel, cooperating power transmitting elements in said casing and on said rotor comprising respectively a plurality of pivoting vane members and rotary abutment members; said rotor having longitudinal cylindrical bores intersecting and opening through its peripheral surface, said abutment members being cylindrical and the same length as said rotor, said abutment members being mounted in said bores with a rotating fit and extending outward in rolling contact against the inner surface of said casing to divide said annular channel into a plurality of working spaces, each abutment member being equipped with two radial passing slots extending the full length of said abutment member to a depth equal to the width of said channel, said abutment members being geared to said casing to turn in the same direction as said rotor and casing and timed to allow passage of said vane members when said vane members project into said channel, said abutment members having their passing slots 180° out of phase with respect to each other and arranged to hold fluid in said channel stationary in relation to said rotor; said vane members extending the full length of said channel on the outer side thereof and being about twice as wide as said channel, vane shafts in the leading edges of said vane members pivotally mounted in said casing and equipped with coil springs which tend to restore the vane members to a normally open position, said coil springs having inner ends secured to said vane shafts and outer ends secured to said casing, said vane members being arranged to open and close said channel, revetment chambers behind said vanes communicating with said annular channel at the leading edge of each of said vane members, each vane member having a working surface on one side facing said rotor and a balancing surface on an opposite side exposed to fluid pressure in said chamber, said working and balancing surfaces being angularly related to form a wedge-shaped vane having a thick trailing edge, the angle between said surfaces being less than 90° and said trailing edge comprising an arcuate surface concentric with the vane shaft, an arcuate vane shield on the trailing side of each chamber protruding into said annular channel behind the vane and wiping said arcuate trailing edge thereof as the vane member swings into said channel to form a sealing surface for preventing leakage of fluid from said chamber around the trailing edge of the vane member when said vane members are closed against said rotor; a disc fixed to said driven shaft adjacent said rotor, a movable combined disc and sleeve splined to said driven shaft for axial movement thereon, a thrust ring on said sleeve arranged to receive and transmit axial thrust from an external source to said movable disc, a floating disc coaxial with and disposed between said two discs, springs forcing said two discs apart to clear said floating disc, gear teeth on the periphery of said floating disc, gears on the ends of said vane shafts in mesh with said last gear; said floating disc, peripheral gear and related meshing gears all turning in unison with said casing when the transmission is operating in neutral with said vane members in open position but said floating disc and peripheral gear being arranged to be retarded in said turning motion when an axial thrust is exerted on said thrust ring moving said movable disc into gripping engagement with said floating disc causing said peripheral gear to turn relative to said casing, said relative turning rotating said meshing gears on said vane shafts and said vane members to control the angle of the pivoting vane members in said annular channel regulating the amount of fluid that passes said vane members to govern the rate of relative rotation between said casing and rotor and thus control the ratio of the transmission, said springs on said vane shafts returning said vane members toward their neutral open positions as the axial thrust on said thrust ring is reduced.

7. An hydraulic power transmission comprising a driving member and a driven member, said driving member comprising a cylindrical rotatable casing and said driven member comprising a cylindrical rotor of smaller diameter than said casing mounted concentrically within and enclosed by said casing to provide an annular channel for retaining hydraulic fluid between said rotor and casing; longitudinal vanes mounted on longitudinal shafts in said casing for pivotal movement in said channel toward and away from said rotor, spring means for retracting said vanes away from said rotor to open said channel, means connected with said shafts for rotating said vanes into contact with said rotor to close said channel; longitudinal cylindrical abutment members rotatably mounted in the periphery of said rotor, said abutment members being contained partially within said rotor and projecting outward therefrom in rolling contact with the inner surface of said casing to close said channel and divide said channel into a plurality of working spaces, said abutment members having longitudinal radial passing slots and said abutment members being geared to said casing and timed to allow passage of said vanes in said slots when said vanes are projected into said channel; means operable by the rotation of said driving member relative to said driven member to operate said vane rotating means in opposition to said spring retracting means, and variable control means having parts external to the transmission for actuating said operating means.

References Cited in the file of this patent

UNITED STATES PATENTS

| | | |
|---|---|---|
| 808,226 | Anderson | Dec. 26, 1905 |
| 854,107 | Pick | May 21, 1907 |
| 870,814 | Coligny | Nov. 12, 1907 |
| 1,032,283 | Henderson | July 9, 1912 |
| 1,461,556 | Reece | July 10, 1923 |
| 1,636,700 | McHinney | July 26, 1927 |
| 2,178,804 | Murphy | Nov. 7, 1939 |
| 2,184,506 | Eason | Dec. 26, 1939 |

FOREIGN PATENTS

| | | |
|---|---|---|
| 720,686 | France | Dec. 4, 1931 |